Jan. 17, 1956  R. L. BOGAR  2,731,214
FISHING REEL
Filed June 7, 1954
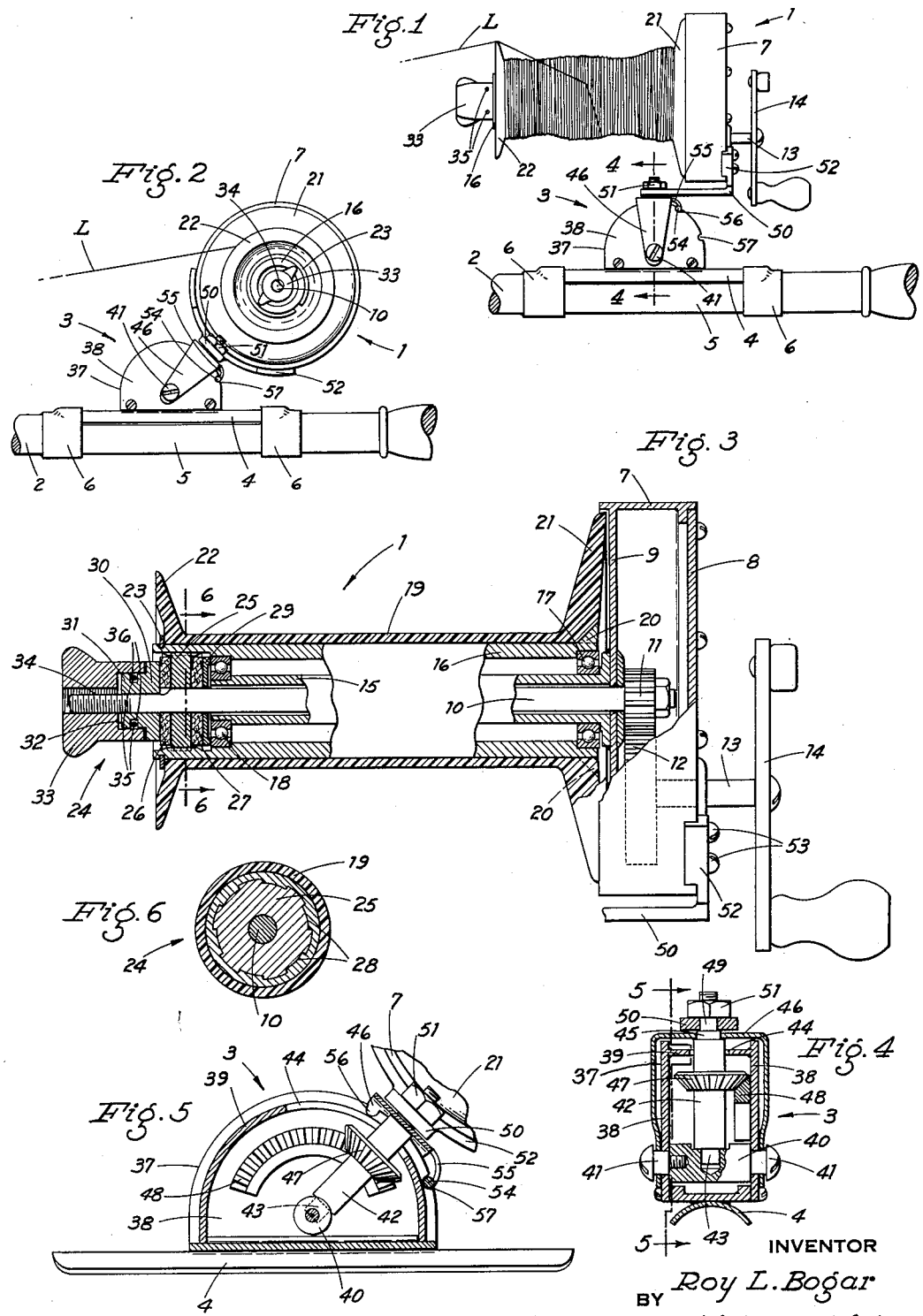
INVENTOR
Roy L. Bogar
BY
Webster & Webster
ATTYS.

United States Patent Office 2,731,214
Patented Jan. 17, 1956

2,731,214

FISHING REEL

Roy L. Bogar, Stockton, Calif.

Application June 7, 1954, Serial No. 435,006

7 Claims. (Cl. 242—84.5)

The present invention is directed to, and it is a major object to provide, an improved fishing reel, and particularly one of the line casting type.

Another object of this invention is to provide a fishing reel which embodies a line spool supported so that one end is free or unobstructed at all times; there being a novel mount for the reel arranged to permit of ready manual adjustment thereof—selectively— to a line casting position with the spool extending lengthwise of the rod, with said free end foremost, for spinning type line casting, and wherein the line spins off said free end of the spool without rotation of the latter; or to a fishing and line retrieving position with the spool extending transversely of the rod so that the line may be wound onto said spool upon rotation of the latter by hand crank actuated mechanism included in the reel.

Still another object of the present invention is to provide a reel mount, as above, which is arranged so that the spool when in said line casting position is spaced from the rod a greater distance than when in said fishing and line-retrieving position; the spool automatically moving inwardly to said fishing and line retrieving position, and automatically moving outwardly to said line casting position, when said spool is part-circle rotated in one direction or the other, respectively.

An additional object of the invention is to provide the fishing reel with a novel drag unit which adjustably resists rotation of the spool.

A further object of the invention is to provide a fishing reel wherein the line spool is quick-detachable to permit of the replacement on said reel of another spool carrying a different size line.

It is also an object of the invention to provide a fishing reel which is designed for ease and economy of manufacture, and convenience of use.

A separate object of the invention is to provide a practical, reliable, and durable fishing reel, and yet one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the fishing reel as mounted on a rod; the reel being shown in the line casting position.

Fig. 2 is a similar view but shows the reel adjusted to the fishing and line retrieving position; the view looking at the free end of the spool.

Fig. 3 is an enlarged fragmentary view, mainly in section, of the reel assembly, including the spool and the drag unit.

Fig. 4 is an enlarged transverse sectional elevation of the reel mount; the view being taken on line 4—4 of Fig. 1.

Fig. 5 is a fragmentary sectional elevation showing the reel mount; the view being taken on line 5—5 of Fig. 4, but illustrating the position of the parts when the reel is in said fishing and line retrieving position.

Fig. 6 is a cross section taken on line 6—6 of Fig. 3.

Referring now more particularly to the drawings and to the characters of reference marked thereon, the reel assembly is indicated generally at 1, and such assembly is secured to a fishing rod, shown in part at 2, by a mount, indicated generally at 3.

The mount 3, which will hereinafter be described in greater detail, includes a longitudinal saddle plate 4 which engages on the reel seat 5 of the rod 2; such saddle plate 4 being removably secured to said reel seat by sliding ring clamps 6.

The reel assembly 1 comprises a circular housing 7 which includes a back plate 8 and a front plate 9. An axle 10 extends from within the circular housing 7 and projects centrally through the front plate 9 to a termination a substantial distance therebeyond. The axle 10 is fitted, in the housing 7, with a pinion 11 driven by a gear 12 from a stub shaft 13 which projects through the back plate 8; such stub shaft 13 being fitted on its outer end with a crank handle 14.

A stationary inner sleeve 15 is fixed to the front plate 9 and surrounds the axle to a point adjacent but short of the outer end of the latter. A rotary outer sleeve 16 carried on longitudinally spaced anti-friction bearings 17 and 18 extends in spaced parallel relation to the stationary inner sleeve 15 for the full length thereof, and projects somewhat beyond its free end, yet terminating short of the corresponding end of the axle 10.

A spool 19, preferably of plastic or other lightweight material, engages in close fitting but removable relation on the rotary outer sleeve 16, being normally maintained for rotation with the latter by lugs 20, on the inner end of said sleeve 16, which engage in matching relation in notches in the adjacent end of said spool. The spool 19 includes a circular inner end flange 21 which is substantially the diameter of the circular housing 7, whereas at the other end said spool is formed with a circular outer end flange 22 of considerably lesser diameter.

The spool 19 is normally but quick-removably maintained on the rotary outer sleeve 16 by means of a snap ring 23 on the free end portion of said sleeve 16 immediately beyond the adjacent end of said spool. By the simple expedient of removing the snap ring 23, the spool 29 can be removed and another spool, with a different size line thereon, replaced.

In order to prevent line breakage when a large size fish is being played, or when a snag or other obstruction is caught by the lure—as when trolling—the reel is provided with an adjustable drag unit, indicated generally at 24, and which comprises the following:

A sliding washer 25 surrounds the axle 10 within the outer end portion of the sleeve 16 but beyond the corresponding end of the sleeve 15. An outer friction washer 26 and an inner friction washer 27 are disposed on opposite sides of the sliding washer 25. The latter, while being rotatable on the axle 10, is splined at the periphery, as at 28, to the rotary outer sleeve 16 whereby to prevent relative rotation between said parts; i. e., causing both to rotate together.

A spacer washer 29 surrounds the axle 10 between the inner friction washer 27 and the bearing 18; said spacer washer 29 being formed, as by thickening adjacent the periphery, so that it bears only against the outermost race of the bearing 18.

Beyond or outwardly of the outer friction washer 26 the drag unit 24 includes a pressure collar 30 formed with an axially outwardly projecting boss 31 which seats in relatively rotatable relation in an inwardly opening bore 32 of an adjustable nut 33 threaded on the outer end of the axle 10. The outer end portion of the axle 10, including the part which extends through the pressure collar 30 and boss 31, is cut flat on one side, as at 34, and said collar and boss have a matching bore through which this portion of the axle extends, to the end that the collar must turn with the axle, but can slide thereon under the influence of the adjustable nut 33. The nut 33 is relatively rotatably tied to the boss 31, but held against relative axial displacement, by means of cross pins 35 which extend from side to side of the nut 33 within the bore 32 and on opposite sides of the axle 10; said pins riding in an annular groove 36 formed in the boss 31.

When the nut 33 is loosened the collar 30 applies no pressure through the assembly of the washers 25, 26, and 27, with the result that the outer sleeve 16 and the spool 19 are free-running relative to the axle 10, and as may be desired under certain fishing conditions.

However, when the nut 33 is tightened, advancing the collar 30 inwardly, the assembly of washers 25, 26, and 27 are clamped together with a compression force dependent on the extent of adjustment of the nut 33. Under this condition the spool 19 may either be locked relative to the axle 10 or may be rotatable with drag or resistance to unwinding of the line. Thus, as will be obvious, the extent of the effectiveness of the drag unit 24 is wholly dependent on the adjustment 33. The drag unit 24 is primarily useful when the spool 19 is disposed transversely of the rod in fishing and line retrieving position, as in Fig. 2.

The mount 3 for the reel assembly 1 comprises, in addition to the longitudinal saddle plate 4, an outwardly projecting, substantially semi-circular housing 37 attached on the straight side, lengthwise to the saddle plate 4; i. e., with the axis of said housing intersecting the longitudinal axis of the rod 2 at a right angle. The housing 37 includes sides 38 and a circumferential closure 39 concentric to, but disposed inwardly of, the periphery of said sides 37.

An arbor 40 is disposed axially in the housing 37, being turnably secured therein by end screws 41 which pass through the sides 38. A short spindle 42 radiates from the arbor 40 centrally between the sides 38, and at its inner end said spindle is formed with a trunnion 43 journaled in the arbor 40. The outer end portion of the spindle 42 projects through a circumferential slot 44 formed in the closure 38.

Adjacent but short of its outer end, and outwardly of the plate 39, the spindle 42 is formed with another trunnion 45 journaled centrally in an upstanding, U-shaped yoke 46 which straddles the housing 37 in swingable relation; the inner ends of the legs of said yoke 46 being turnably carried on the shanks of the screws 41.

Within the housing 37 the spindle 42 is fitted with a bevel pinion 47 which runs in mesh with an arcuate bevel rack 48 secured to the inner face of one of the sides 38.

At its outer end the spindle 42 is formed with a reduced-diameter neck 49 which projects from the trunnion 45 through one end of a raidally extending mounting arm 50; said arm being non-rotatably secured on the neck 49 by a nut 51.

At its free end the mounting arm 50 is formed with a cradle 52 which receives—and is secured to—the circular housing 7 by screws 53.

The U-shaped yoke 46 is adapted to be maintained in a right-angle position to the rod 2, or in a rearwardly and inwardly swung position, selectively, by means of a transverse catch bar 54 attached to the cross member of the U-shaped yoke 46 by a spring finger 55 which extends rearwardly and downwardly. The transverse catch bar 54 is adapted to frictionally but removably engage in notches 56 and 57 formed in the periphery of the sides 38 of housing 37; the catch bar 54 engaging in the notches 56 when the yoke 46 is in its right-angle position to the rod, as in Fig. 1, and to engage in the notches 57 when said yoke is swung rearwardly and downwardly, as in Figs. 2 and 5.

For casting of the line L from the spool 19, the reel assembly 1 occupies the position shown in Fig. 1, wherein said spool extends parallel to the rod 2 with the free end of said spool foremost. In this position the spool 19 is disposed a substantial distance from the rod and when the cast is made the line L spins freely and without backlashing from the free end of the spool 19, running over the relatively small end flange 22.

After the cast is made the fisherman grasps the reel assembly 1 and manually turns it 90°, whereby to dispose the spool 19 in right angle intersecting relation to the rod 2 (see Fig. 2). This is the fishing and line retrieving position of the reel. When the reel assembly 1 is turned 90°, as above, such motion is transmitted by the mounting arm 50 to the spindle 42, and the turning motion causes the bevel pinion 47 to travel rearwardly on the rack 48, with the result that said spindle 42 and yoke 46 swing rearwardly and downwardly; the catch bar 54 escaping the notches 56 and coming to rest in the notches 57. This results in the reel assembly 1 moving considerably closer to the rod 2 when the reel is adjusted to said fishing and line retrieving position; the advantage being that with the reel closer to the rod the crank handle 14 is more convenient for access and manipulation.

Upon return of the reel to the casting position, as in Fig. 1, the rack and pinion assembly cause the spindle 42 and yoke 46 to reassume a position at a right angle to the rod 2.

Thus, by the simple expedient of quarter-turning the reel assembly 1, the reel can be readily, conveniently, and selectively set to casting position, or fishing and line retrieving position.

In such latter position it is desirable—dependent upon the fishing conditions—to have the spool 19 locked up relative to the axle 10, or turnable relative thereto with a certain amount of drag; this being accomplished easily by adjustment of the nut 33 of the hereinbefore described adjustable drag unit 24.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A fishing reel comprising a hand crank actuated reel assembly including a spool having a free end, and a mount adapted to secure the reel assembly to a rod; said mount embodying a rotatable spindle, means securing the reel assembly on asid spindle as a unit rigid therein for manual rotary adjustment of the spindle and assembly between one position with the spool extending lengthwise of the rod with said free end foremost, and another position with the spool extending transversely of the rod, and releasable means to hold the reel assembly in either of said positions; means mounting the spindle for independent swinging movement about an axis transversely of the rod, and means between the spindle and mount responsive to rotation of the spindle upon adjustment of the reel assembly from said one position to said other position operative to swing the spindle about said axis in a direction to cause the reel assembly to move closer to the rod.

2. A fishing reel comprising a hand crank actuated reel assembly including a spool having a free end, and a mount adapted to secure the reel assembly to a rod; said mount embodying a rotatable spindle which projects away from the rod, a radial arm fixed on the spindle for rotation therewith, means securing the reel assembly on the radial arm for manual rotary adjustment with said spindle as the axis between one position with the spool extending lengthwise of the rod with said free end foremost, and another position with the spool extending transversely of the rod, and releasable means to hold the reel assembly in either of said positions; means included with the mount supporting the spindle for independent swinging movement about an axis transversely of the rod, and means between the spindle and mount operative to swing the spindle to a position with the arm closer to the rod when the reel assembly is moved to said other position.

3. A fishing reel, as in claim 2, in which said last named means is a rack and pinion unit.

4. A fishing reel comprising a hand crank actuated reel assembly including a spool having a free end, and a mount adapted to secure the reel assembly to a rod; said mount comprising a support adapted for connection to the reel seat of the rod, a spindle projecting away from the reel seat, means mounting the spindle on the support for rotation about the longitudinal axis of said spindle and independent swinging movement about an axis transversely of the rod, means mounting the reel assembly on the outer end of the spindle for manual rotary adjustment therewith between one position with the spool extending lengthwise of the rod with said free end foremost, and another position with the spool extending transversely of the rod, and means between the spindle and support operative in response to rotation of the spindle upon adjustment of the reel assembly from said one position to said other position, to cause swinging motion of said spindle about said transverse axis so that the reel assembly is closer to the rod in said other position than when in said one position.

5. A fishing reel comprising a hand crank actuated reel assembly including a spool having a free end, and a mount adapted to secure the reel assembly to a rod; said mount comprising a support adapted for connection to the reel seat of the rod, a spindle projecting away from the reel seat, means mounting the spindle on the support for rotation about the longitudinal axis of said spindle and independent swinging movement about an axis transversely of the rod, means mounting the reel assembly on the outer end of the spindle for manual rotary adjustment therewith between one position with the spool extending lengthwise of the rod with said free end foremost, and another position with the spool extending transversely of the rod, and a rack and pinion unit between the spindle and support operative in response to rotation of the spindle upon adjustment of the reel assembly from said one position to said other position, to cause swinging motion of said spindle about said transverse axis so that the reel assembly is closer to the rod in said other position than when in said one position.

6. A fishing reel comprising a hand crank actuated reel assembly including a spool having a free end, and a mount adapted to secure the reel assembly to a rod; said mount comprising a housing adapted to be secured to and projecting from the reel seat of the rod, the housing including transversely spaced sides, a spindle disposed between said sides and projecting outwardly therebeyond, means mounting the inner end of the spindle in connection with the housing for rotation about the lonigtudinal axis of said spindle and for independent swinging about an axis transversely of the rod, an inverted U-shaped yoke straddling the housing, means pivoting the legs of the yoke to the housing for swinging of said yoke about said transverse axis, the spindle being journaled in the cross member of the yoke and projecting therebeyond, means securing the reel assembly on the outer end of the spindle for manual rotary adjustment between one position with the spool extending lengthwise of the rod with said free end foremost, and another position with the spool extending transversely of the rod, a pinion on the spindle within the housing, and an arcuate rack on one side of the housing and with which rack the pinion meshes; said rack and pinion being operative in response to turning motion of the spindle upon adjustment of the reel assembly from said one position to said other position, to cause swinging motion of said spindle about said transverse axis so that the reel assembly is closer to the rod in said other position than when in said one position.

7. A fishing reel, as in claim 6, in which at least one side of the housing is formed with a peripheral edge concentric to said transverse axis, a spring finger projecting from the cross member of the yoke in a generally circumferential direction, and a catch on said finger spring engaging and riding on said peripheral edge; the latter having circumferentially spaced notches therein in which the catch releasably engages when the reel assembly is in said one position or said other position.

References Cited in the file of this patent

UNITED STATES PATENTS

| | | |
|---|---|---|
| 2,083,689 | Clifford | June 15, 1937 |
| 2,439,298 | Horan | Apr. 6, 1948 |
| 2,604,273 | Hayes | July 22, 1952 |
| 2,649,257 | Shelburne | Aug. 18, 1953 |
| 2,667,312 | Denison et al. | Jan. 26, 1954 |

FOREIGN PATENTS

| | | |
|---|---|---|
| 211,406 | Great Britain | Feb. 21, 1924 |
| 306,231 | Great Britain | Feb. 21, 1929 |